Mar. 27, 1923.
R. NALL
INNER TUBE FOR PNEUMATIC TIRES
Filed Oct. 12, 1922
1,449,692
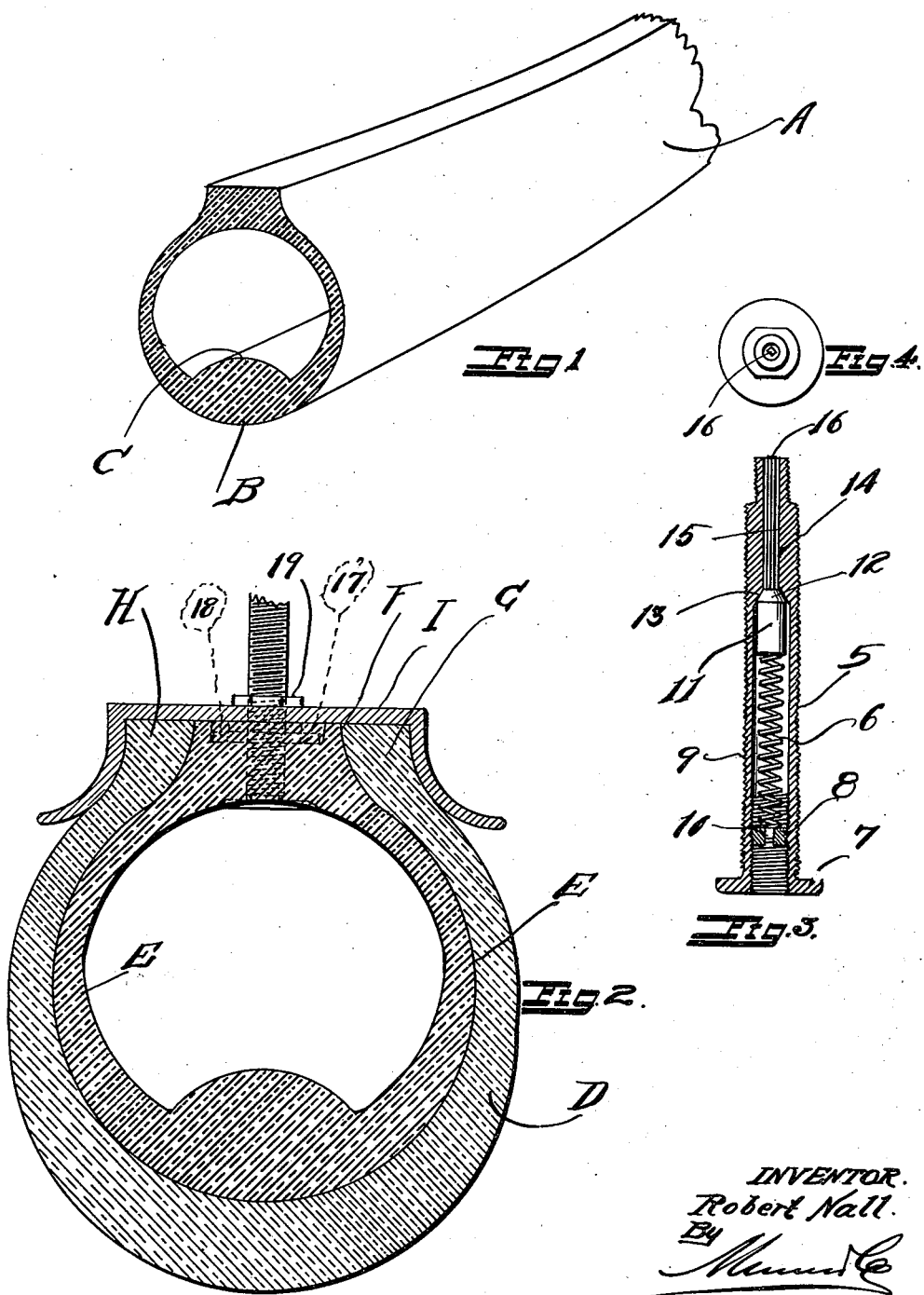
INVENTOR.
Robert Nall.
By
ATTORNEYS Patented Mar. 27, 1923.

1,449,692

UNITED STATES PATENT OFFICE.

ROBERT NALL, OF OAKLAND, CALIFORNIA.

INNER TUBE FOR PNEUMATIC TIRES.

Application filed October 12, 1922. Serial No. 594,162.

*To all whom it may concern:*

Be it known that I, ROBERT NALL, a citizen of the United States, and a resident of Oakland, county of Alameda, State of California, have invented a new and useful Inner Tube for Pneumatic Tires, of which the following is a specification.

My invention relates in general to pneumatic tires as used on vehicles or automobiles, and has reference more particularly to an improvement in inner tubes for such tires.

As heretofore practiced, the ordinary inner tube which receives the air pressure for supporting the outer casing of the tire has usually been made of relatively thin rubber and adapted to receive a relatively high air pressure. In order that tires equipped with such tubes could properly function without unnecessary deterioration and abuse, it is necessary to maintain the inner tube inflated to a maximum operating degree which leaves the tire so hard that the vehicle does not ride easily; then again, owing to the wear and tear on the tire in general, the tube is more or less abused, which gives it a short life and lays it open to punctures and the like.

The primary object of my invention is to overcome the many disadvantages of the customary inner tube by providing a tube which will be unusually rugged and capable of withstanding abuses, and at the same time require only a moderate air pressure to supply the desired supporting medium.

The preferred construction of the invention is illustrated in the accompanying drawing, in which Figure 1 is a view in perspective of a section of my tube; Figure 2 is a transverse section of the tube as applied to an outer casing, with the casing on the tire rim; Figure 3 is a view in vertical section of a valve which I propose to use with the tube; and Figure 4 is a top plan view of the valve.

Referring now to the drawing in detail, I propose to make the tube A of a relatively thick and rugged structure by forming the same with a circumferential tread thickness as at B with the thickness extending into the interior of the tube with a crest as at C. The circumferential thickness B is presented beneath the tread surface of the outer casing D, and the sides E of the tube decrease in thickness from the thickness B to the inner circumference F. Even so, the thickness of the tube at its thinnest point is thicker than that of the ordinary tube. The inner circumference F is made quite thick with the thickness formed to correspond to the space between the confronting sides G and H of the opening in the casing D.

When the tire is assembled with the tube within the casing the thickness F lies flush with the termination of the sides G and H of the casing so that these parts may set within the rim I.

From the above it will be readily seen that the thickness B on the tube will practically prevent tacks, glass, or other impaling devices from puncturing the tire, although in the case of a very long nail it may extend through the tube, if it went in at the proper angle. However, the construction of the tube makes the same puncture proof within the accepted meaning of the term.

I propose to use a specially constructed valve with the tube, and while the same embodies the same general characteristics of an ordinary valve, it preferably comprises a stem (5) which is threaded throughout its length as is customary, having a relatively large internal recess (6) terminating flush with the button (7) which is presented through an opening in the thickness F of the tube so as to enable air to be introduced into the tube, and with the button preventing displacement of the stem. Positioned within the recess (6) is an abutment (8) which is threaded into the recess from the opening in the button (7) so as to provide a seat for the coil spring (9). The abutment is made with an opening (10) so as not to retard the introduction of air through the stem into the tube. The opposite end of the coil spring (9) abuts against the under side of a plunger (11) which is tapered as at (12) and adapted to seat against the tapered shoulder (13) at the upper termination of the recess (6). The recess (6) at the tapered shoulder (13) terminates in the relatively small recess (14) which extends to the top of the stem. The plunger (11) is made with a stem (15) which extends through the recess (14) and terminates in a square end (16). The influence of the spring (9), together with the air pressure within the tube, holds the plunger (11) against its tapered seat (13) to prevent escape of air from the tube, and when air is to be introduced into the tube the customary filling valve is placed over the reduced end of the stem and the pressure of the air will unseat the plunger and permit the tube to be filled.

Should dust or other foreign matter get between the taper (12) of the plunger and its seat, so that the valve is not properly seated, the valve cap, which should be made with a square hole to correspond to the square end (16) of the stem (15) may be used to turn the plunger around and clean the seat.

To hold the stem rigid and to make a tight fit, I propose to counter-sink a recess in the thickness F of the inner tube around the opening through which the stem passes, and to use a washer (17) on the stem which is seated in the counter-sink and a locknut (18) on top of the washer. The top of the lock nut should come flush with the rim and as the stem passes through the rim a second locknut (19) may be used on the outside of the rim as is customary. The usual dust cap should also be used.

I claim:

An inner tube for pneumatic tires embodying in its construction a relatively thick rib like enlargement extending circumferentially around the inside of the tire directly beneath the tread surface of the outer casing of the tire, the sides of the tube decreasing in thickness from said enlargement to the inner circumference of the tube, and the inner circumference of the tube formed with a relatively thick enlargement corresponding to the space between the sides of the opening in the inner circumference of the casing.

ROBERT NALL.